(12) United States Patent
Schumacher et al.

(10) Patent No.: US 6,238,442 B1
(45) Date of Patent: May 29, 2001

(54) YELLOW DYE MIXTURES COMPRISING WATER-SOLUBLE FIBER-REACTIVE AZO DYES AND USE THEREOF

(75) Inventors: Christian Schumacher, Kelkheim; Birgit Eden, Frankfurt am Main, both of (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/433,983

(22) Filed: Nov. 4, 1999

(30) Foreign Application Priority Data

Nov. 7, 1998 (DE) ................................................ 198 51 389

(51) Int. Cl.[7] ........................... C09B 67/24; D06P 1/382; D06P 1/384
(52) U.S. Cl. ....................................................... 8/549; 8/641
(58) Field of Search ......................................... 8/549, 641

(56) References Cited

U.S. PATENT DOCUMENTS 5,354,341 * 10/1994 Moser et al. .
5,356,444 * 10/1994 Schwartz et al. .
5,364,416 * 11/1994 Schwartz et al. .

FOREIGN PATENT DOCUMENTS 1-170661   7/1989   (JP) .

* cited by examiner

*Primary Examiner*—Margaret Einsmann
(74) *Attorney, Agent, or Firm*—Connolly Bove Lodge & Hutz LLP

(57) ABSTRACT

Disclosed are dye mixtures comprising yellow dyes of the formulae indicated and defined in claim 1 which are useful for dyeing hydroxyl- and/or carboxamido-containing material, especially fiber material, such as cellulose fibers, for example cotton and filament viscose, and wool and also synthetic polyamide fibers.

20 Claims, No Drawings

YELLOW DYE MIXTURES COMPRISING WATER-SOLUBLE FIBER-REACTIVE AZO DYES AND USE THEREOF

DESCRIPTION

This invention relates to the technical field of fiber-reactive azo dyes.

Japanese Patent Application Publication Hei-1-170 661 discloses mixtures of yellow-dyeing monoazo dyes having a fiber-reactive group of the vinyl sulfone series, but they have certain application defects.

Yellow-dyeing fiber-reactive dyes frequently have the technical disadvantage of being more or less photochromic, i.e., that the dyeings obtainable therewith have different hues in muted light and daylight. This effect is particularly noticeable in the case of combination shade dyeings with red- and blue-dyeing dyes in certain shades, such as beige, brown and green. This disadvantage leads to problems with shade-passing the dyed production lots in textile dyehouses.

There are some monoazo dyes of the benzene-azo-benzene and naphthalene-azo-benzene series which are appreciated on account of their interesting hue and their good dyeing properties, but which appear to be in need of improvement on account of their disadvantageous photochromism. On the other hand, azo dyes having a pyrazolone coupling component are less photochromic, but frequently have deficiencies in their dyeing properties.

The present invention, then, provides dye mixtures comprising yellow-dyeing dyes, which surprisingly afford less photochromic dyeings than would be expected from the fractions of the individual dyes.

The invention thus relates to dye mixtures comprising one or more, such as two or three, preferably 1 or 2, dyes of the hereinbelow indicated and defined general formula (1a) or of the hereinbelow indicated and defined general formula (1b) or of the general formulae (1a) and (1b) and one or more, such as two or three, preferably 1 or 2, dyes of the hereinbelow indicated and defined general formula (2a) or (2b) or (2c) or of a combination of the dyes of the formulae (2a) to (2c) in a molar ratio of the dyes (1a) or (1b) or (1a) and (1b) to the dyes (2a) or (2b) or (2c) or a combination selected from the dyes (2a) to (2c) of 70:30 to 30:70, preferably 60:40 to 40:60,

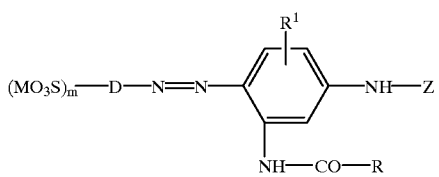
(1a)

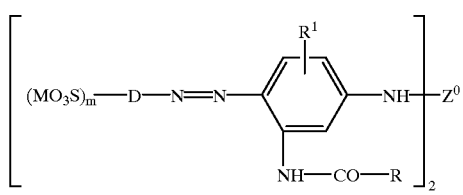
(1b)

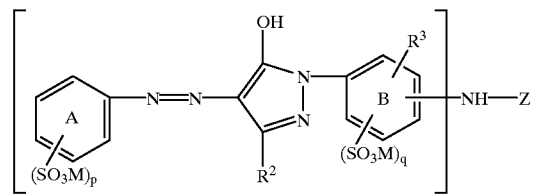
(2a)

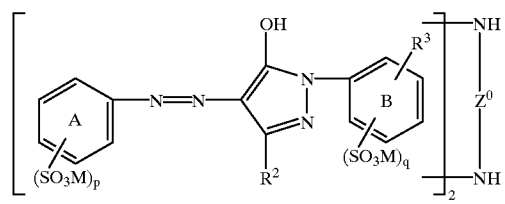
(2b)

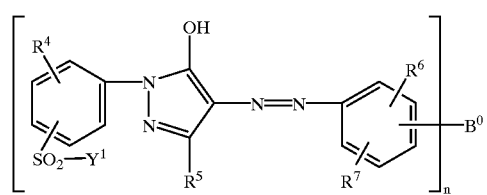
(2c)

wherein:
M is hydrogen or an alkali metal, such as sodium, potassium or lithium;
D is the radical of benzene or of naphthalene;
$Y^1$ is vinyl or is ethyl which is substituted in the Deposition by an alkali-eliminable substituent, for example by chlorine, sulfato, thiosulfato, phosphate, alkanoyloxy of 2 to 5 carbon atoms, such as acetyloxy, and sulfobenzoyloxy, and is preferably vinyl, β-chloroethyl or β-sulfatoethyl, more preferably vinyl or β-sulfatoethyl;
R is amino or alkyl of 1 to 4 carbon atoms, such as methyl, or alkyl of I to 4 carbon atoms, such as methyl and especially ethyl, which is substituted b carboxyl, sulfo, sulfato, phosphate, hydroxyl or a —SO$_2$—$Y^2$ group, where $Y^2$ has one of the meanings of $Y^1$;
$R^1$ is hydrogen, alkyl of 1 to 4 carbon atoms, such as ethyl and especially 1 methyl, alkoxy of 1 to 4 carbon atoms, such as ethoxy and especially methoxy, or sulfo, preferably hydrogen or sulfo, $R^1$ being preferably disposed para to the —NH—CO—R group;
m is 1, 2 or 3, preferably 2 or 3;
Z is a fiber-reactive radical selected from the group of the halopyrimidines, such as the difluoro- or trifluoro- or chlorofluoro- or chloro-difluoro-pyrimidines, of the dichloroquinoxalines or of the halotriazines, such as chloro- or fluorotriazines, which are optionally substituted by an ether or amino grouping, where the radical of the halotriazine can also be bonded to a fiber-reactive group of the vinyl sulfone series conforming to the general formula —SO$_2$—Y, where $Y^3$ has one of the meanings of $Y^1$, and this group is attached via a bridge member, such as phenylene, methoxy-, ethoxy-, methyl-, ethyl-, sulfo- and/or chlorine-substituted phenylene, alkylene of 1 to 6 carbon atoms, which may be interrupted by 1 or 2 hetero groups, such as —O— and/or —NH—, or a combination of these groups to an amino group attached to the triazine radical;

$Z^0$ is a bivalent radical of the general formula (3)

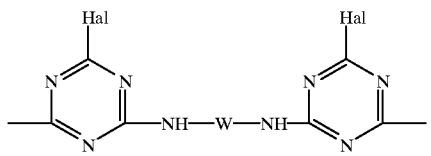

(3)

where

Hal is chlorine or fluorine, and

W is phenylene, alkylene, phenylene-alkylene-phenylene, phenylene-alkenylene-phenylene or phenylene-phenylene or a radical of the general formula phen-G-phen, where the phenylene radicals may be substituted by 1 or 2 substituents selected from the group consisting of methoxy, ethoxy, methyl, ethyl, sulfo and carboxyl, the alkylene radicals contain 1 to 6 carbon atoms, preferably 2 to 4 carbon atoms, and may be substituted by sulfo or carboxyl and/or interrupted by 1 or 2 hetero groups, such as —O— and —NH—, and the alkenylene radicals are those of 2 to 4 carbon atoms, preferably vinylidene, and where phen is equal to phenylene of the above definition and G is —O—, —NH—, —CO— or —NH—CO—NH—;

R is methyl or carboxyl;

$R^3$ is hydrogen, halogen, such as chlorine, alkyl of 1 to 4 carbon atoms such as methyl or ethyl, or alkoxy of 1 to 4 carbon atoms, such as methoxy or ethoxy, preferably hydrogen, methyl or chlorine;

p is zero, 1 or 2, and q is zero, 1 or 2, where the sum of (p+q) is 1, 2 or 3 and the —$SO_3M$ group is hydrogen when p is zero or q is zero;

in the formula (2a) the —NH—Z group is attached to the benzene nucleus A or to the benzene nucleus B;

in the formula (2b) one amino group of the bridge member —NH—$Z^0$13 NH— is attached to the benzene nucleus A of one monoazo radical and the other amino group is attached to the benzene nucleus B of the other monoazo radical or both the NH groups are attached to both As or to both Bs;

R is hydrogen, sulfo, alkyl of 1 to 4 carbon atoms, such as methyl or ethyl, or alkoxy of 1 to 4 carbon atoms, such as methoxy or ethoxy, preferably hydrogen or methoxy;

$R^5$ is methyl or carboxyl;

R is hydrogen, sulfo, carboxyl, alkyl of 1 to 4 carbon atoms, such as ethyl or methyl, or alkoxy of 1 to 4 carbon atoms, such as ethoxy or methoxy, hydrogen, sulfo or methyl;

is hydrogen, sulfo, alkyl of 1 to 4 carbon atoms, such as ethyl or methyl, or alkoxy of 1 to 4 carbon atoms, such as ethoxy or methoxy, preferably hydrogen;

n is 1 or 2;

$B^0$ is hydrogen when n is 1, or is a direct covalent bond, alkylene, alkenylene or alkylene-phenylene-alkylene when n is 2, in which the phenylene radicals may be substituted by 1 or 2 substituents selected from the group consisting of methoxy, ethoxy, methyl, ethyl, sulfo and carboxyl, the alkylene radicals contain 1 to 6 carbon atoms, preferably 2 to 4 carbon atoms, and may be substituted by sulfo or carboxyl and/or interrupted by 1 or 2 hetero groups, such as —O— and —NH—, and the alkenylene radicals are those of 2 to 4 carbon atoms, preferably vinylidene, or $B^0$ is a group of the hereinabove defined formula element $Z^0$.

In the above general formulae and also in the subsequent general formulae, the individual constituents of the formulae, whether they bear identical or different designations, can have meanings under their definition which are mutually identical or different.

The terms "sulfo", "thiosulfato", "carboxyl", "phosphate" and "sulfato" cover not only the acid form but also the salt form of the respective groups. Accordingly, sulfo groups are groups conforming to the general formula —$SO_3M$, thiosulfato groups are groups conforming to the general formula —S—$SO_3M$, carboxyl groups are groups conforming to the general formula —COOM, phosphate groups are groups conforming to the general formula —$OPO_3M_2$ and sulfato groups are groups conforming to the general formula —$OSO_3M$, where each M is as defined above.

Hereinbelow the dyes of the general formulae (1a) and (1b) may be referred to globally as "dyes (1)" and the dyes (2a), (2b) and (2c) as "dyes (2)".

The dyes (1) and (2) are generally known and extensively described in German, British and European patent application publications and also in British and U.S. patents, or can be prepared similarly to the directions provided therein.

In the dyes of the general formula (1a) and (2a), Z is preferably a radical of the formula (4a), (4b), (4c) or (4d)

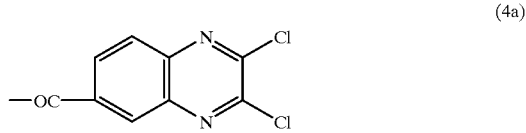

(4a)

(4b)

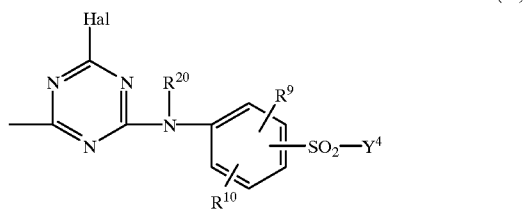

(4c)

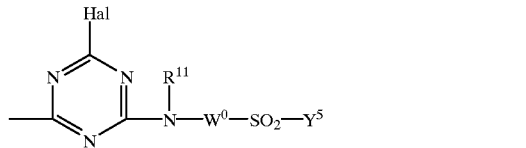

(4d)

wherein:

Hal is as defined above;

$R^8$ is hydrogen, chlorine or fluorine, preferably hydrogen or chlorine;

$R^{18}$ is hydrogen or fluorine, preferably fluorine;

$R^9$ is hydrogen, alkyl of 1 to 4 carbon atoms, such as methyl or ethyl, or alkoxy of 1 to 4 carbon atoms, such as methoxy or ethoxy, preferably hydrogen, methoxy or methyl, especially hydrogen;

$R^{10}$ is hydrogen, alkyl of 1 to 4 carbon atoms, such as methyl or ethyl, or alkoxy of 1 to 4 carbon atoms, such as methoxy or ethoxy, preferably hydrogen or methoxy, especially hydrogen;

$R^{20}$ is hydrogen or alkyl of 1 to 4 carbon atoms, such as methyl and ethyl, preferably hydrogen;

$Y^4$ has one of the meanings of $Y^1$;
$Y^5$ has one of the meanings of $Y^1$;
$R^{11}$ is hydrogen, alkyl of 1 to 4 carbon atoms, such as methyl or ethyl, phenyl or chlorine-, sulfo-, methyl- or carboxyl-substituted phenyl and is preferably hydrogen, methyl, ethyl or phenyl;
$W^0$ is alkylene of 1 to 4 carbon atoms, especially n-ethylene and n-propylene, or is alkylene of 3 to 6 carbon atoms, which is interrupted by 1 or 2 hetero groups selected from the group consisting of —O— and —NH—, such as a group of the formula —(CH$_2$)$_2$—O—(CH$_2$)$_2$—, or is a radical of the formula alk-phen or phen-alk or phen where alk is methylene, n-ethylene or n-propylene, preferably methylene or n-ethylene, and phen is phenylene which may be substituted by 1 or 2 substituents selected from the group consisting of sulfo, alkyl of 1 to 4 carbon atoms, such as ethyl and especially methyl, or alkoxy of 1 to 4 carbon atoms, such as ethoxy and especially methoxy, and is preferably unsubstituted phenylene.

Of the halopyrimidine radicals of the general formula (4b), emphasis must be given in particular to those of the general formula (4e) and (4f)

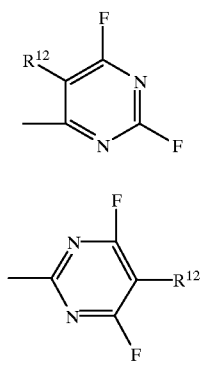

(4e)

(4f)

where $R^{12}$ is hydrogen or chlorine, especially 5-chloro-2,6-difluoropyrimidin4-yl, 2,6-difluoropyrimidin-4-yl and 4,6difluoropyrimidin-2-yl.

In the general formula (2c) the —SO$_2$—Y$^1$ group is preferably attached to the benzene nucleus in a position which is meta or para to the nitrogen atom of the pyrazolone radical; similarly, in formula (4c), the —SO$_2$—Y$^4$ group is preferably disposed in the benzene nucleus in a position which is meta or para to the NH group. If, in the general formula (4d), the —SO$_2$—Y$^5$ group is attached to a benzene nucleus of W$^0$, then it is preferably disposed meta or para to the —N(R$^{11}$)— group and particularly preferably para to the alkylene radical when W$^0$ is alk-phen.

Preferred dye mixtures according to the invention are those which include the dyes of the general formula (1a) and of these those where, in the formula (1a), D is the radical of naphthalene and m is 3, thereamong those where the radical (MO$_3$S)$_m$—D— is preferably 3,6,8- or 4,6,8-trisulfonaphth-2-yl, R is amino and Z has one of the abovementioned meanings, particularly a preferred meaning, further those where the radical (MO$_3$S)$_m$—D— is disulfophenyl, preferably 2,4-disulfophenyl or 2,5-disulfophenyl, R is amino and Z has one of the abovementioned meanings, especially a preferred meaning, and further those where the radical (MO$_3$S)$_m$—D— is a disulfonaphthyl radical, preferably 5,7- or 4,8-disulfonaphth-2-yl, R is methyl and Z has one of the abovementioned meanings, especially a preferred meaning.

Monoazo dyes conforming to the general formula (2a) which are preferably included in the dye mixtures of the invention are for example those of the general formula (5a)

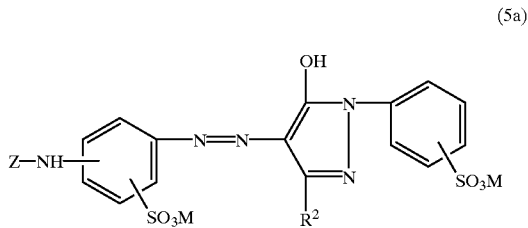

(5a)

where M and R are each as defined above, Z has one of the abovementioned meanings, especially a preferred meaning, the —SO$_3$M group in the diazo component is preferably attached to the benzene nucleus in a position which is ortho to the azo group and the —SO$_3$M group in the coupling component is preferably attached to the benzene nucleus in a position which is para to the nitrogen atom of the pyrazolone radical.

Preference is given in particular to dye mixtures according to the invention with monoazo dyes conforming to the general formula (2c), for example those of the general formula (5b)

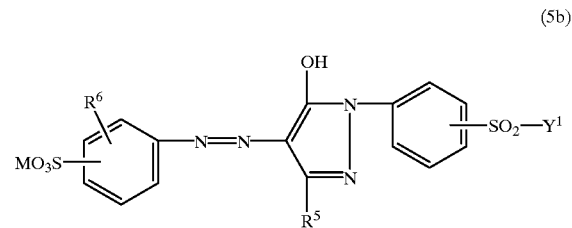

(5b)

where M, $R^5$, $R^6$ and $Y^1$ are each as defined above and the —SO$_2$—Y$^1$ group is preferably attached to the benzene nucleus in a position which is meta or para to the nitrogen atom of the pyrazolone radical, but especially those of the general formula (5c)

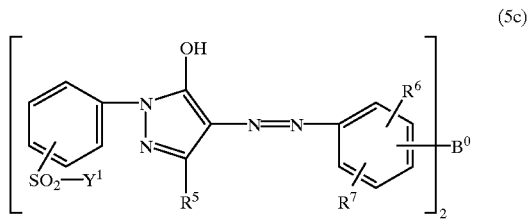

(5c)

where $R^5$ and $Y^1$ are each as defined above,
$R^6$ is hydrogen, methyl or sulfo, $R^7$ is hydrogen or sulfo, preferably sulfo, and $B^0$ is a direct bond, methylene, n-ethylene or vinylidene.

Of the mixture components of the general formula (5c), particularly suitable ones are those where $R^6$ is sulfo, $R^7$ is hydrogen, n is 2, $B^0$ is a direct covalent bond, $Y^1$ is vinyl or 1-sulfatoethyl and $R^5$ is as defined above.

The dyes of the general formula (2c) may, especially if the chromophore is the same, possess different fiber-reactive —SO$_2$—Y$^1$ groups within the definition of $Y^1$ (the same applies to the dyes of the general formula (1a) and (2a) with regard to $Y^2$, $Y^3$, $Y^4$ and $Y^5$ when they contain a —SO$_2$—Y$^2$, —SO$_2$—Y$^3$, —SO$_2$—Y$^4$ or —SO$_2$—Y$^5$ group). More particularly, the dye mixtures may include dyes of the same chromophore which conform to the general formulae discussed here in which the fiber-reactive —SO$_2$—Y$^1$ (or —SO$_2$—Y$^2$, —SO$_2$—Y$^3$, —SO$_2$—Y$^4$ and —SO$_2$—Y$^5$) groups are, on the one hand, vinylsulfonyl groups and, on the other, β-chloroethylsulfonyl or β-thiosulfatoethylsulfonyl or preferably β-sulfatoethylsulfonyl groups. When the dye mixtures include the respective dye components partly as dyes having a vinylsulfonyl group, then the fraction of the respective dye which has the vinylsulfonyl group is up to about 30 mol %, based on the respective dye chromophore.

Groups conforming to the general formulae (6a), (6b) and (6c)

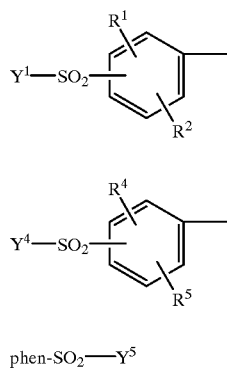

(6a)

(6b)

(6c)

phen-SO$_2$—Y$^5$ which are or may be present in the dyes (1) and (2) are for example 3-(β-sulfatoethylsulfonyl)phenyl, 4-(β-sulfatoethylsulfonyl)phenyl, 2-methyl-5-(β-sulfatoethylsulfonyl)phenyl, 2-methoxy-5-(β-sulfatoethylsulfonyl)phenyl, 4-methyl-3-(β-sulfatoethylsulfonyl)phenyl, 2,5-dimethyl-4-(β-sulfatoethylsulfonyl)phenyl, 2,6-dimethyl-4-(β-sulfatoethylsulfonyl)phenyl, 2-methoxy4-(β-sulfatoethylsulfonyl)phenyl, 4-methoxy-5-(β-sulfatoethylsulfonyl)phenyl, 2-methoxy-5-methyl-4-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl and 2-sulfo4-(β-sulfatoethylsulfonyl)phenyl, especially 3- or 4-(β-sulfatoethylsulfonyl)phenyl, and also derivatives thereof in which the β-sulfatoethylsulfonyl group is replaced by the vinylsulfonyl or β-thiosulfatoethylsulfonyl or β-chloroethylsulfonyl group.

The dye mixtures of the invention are preparable in a conventional manner, for example by mechanically mixing the individual dyes, whether in the form of their dye powders or granules or their as-synthesized solutions or in the form of aqueous solutions of the individual dyes in general, which may further include customary auxiliaries.

The dye mixtures of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further comprise the auxiliaries customary in commercial dyes, such as buffer substances capable of setting a pH in aqueous solution between 3 and 7, such as sodium acetate, sodium citrate, sodium borate, sodium bicarbonate, sodium dihydrogenphosphate and disodium hydrogenphosphate, dyeing auxiliaries, dustproofing agents and small amounts of siccatives; if they are present in a liquid, aqueous solution (including the presence of thickeners of the type customary in print pastes), they may also include substances which ensure a long life for these preparations, for example mold preventatives.

In solid form, the dye mixtures of the invention are generally present as pulverulent or granular preparations which include an electrolyte salt with or without one or more of the abovementioned auxiliaries. The dye mixture fraction in the preparations ranges from 10 to 80% by weight, based on the preparation. The buffer substances are generally present in a total amount of up to 5% by weight, based on the preparation. If the dye mixtures of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 5% by weight, preferably up to 2% by weight.

The dye mixtures of the invention may include further fiber-reactive dyes which are used for shading the dye mixture, in an amount of up to 5% by weight. These "shading dyes" can be added by customary mixing or else be prepared chemically in the same reaction batch together with the above-described synthesis of a dye mixture of the invention and be incorporated into the dye mixture when one or more of the components of the shading dye are identical with the components of the dyes of the formulae (1) and/or (2).

The dye mixtures of the invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the solutions obtained in the synthesis of the dye mixtures of the invention, if desired after addition of a buffer substance, and also if desired after concentrating or diluting, can be used directly as liquid preparation for dyeing.

The present invention thus also relates to the use of the dye mixtures of the invention for dyeing or printing these materials, or rather to processes for dyeing or printing these materials in a conventional manner, by using a dye mixture of the invention or its individual components (dyes) individually together as colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose, and also chemically modified cellulose fibers, such as aminated cellulose fibers or fibers as described for example in PCT Patent Application Publication Nos. WO 96/37641 and WO 96137642 and also in European Patent Application Publication Nos. 0 538 785 and 0 692 559.

Carboxamido-containing materials are for example synthetic and natural polyamides and polyurethanes, especially in the form of fibers, for example wool and other animal hairs, silk, leather, nylon-6,6, nylon-6, nylon-1 1 and nylon4.

The dye mixtures of the invention can be applied to and fixed on the substrates mentioned, especially the fiber materials mentioned, by the application techniques known for water-soluble dyes, especially fiber-reactive dyes. For instance, on cellulose fibers they produce by the exhaust method both from a short and from a long liquor, for example in a liquor to goods ratio of 5:1 to 100:1, preferably 6:1 to 30:1, using various acid-binding agents, and optionally neutral salts, such as sodium chloride or sodium sulfate, dyeings having very good color yields which are improved compared with the individual dyes. Application is preferably from an aqueous bath at temperatures between 40 and 10° C., optionally at a temperature of up to 130° C. under superatmospheric pressure, but preferably at 50 to 80° C., especially 45 to 65° C., and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the bath after the actual dyeing temperature has been reached.

The padding processes likewise provide excellent color yields and very good color build-up on cellulose fibers, the dyes being allowed to become fixed on the material by batching preferably at room temperature (as per the cold pad-batch process), or at elevated temperature, for example at up to 60° C. or in a continuous manner, for example by means of a pad-dry-pad-steam process, by steaming or using dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print paste and subsequent fixation either by passing the printed material through a hot electrolyte-comprising alkaline bath or by overpadding with an alkaline electrolyte-comprising padding liquor with subsequent batching of the alkali overpadded material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the invention on the cellulose fibers include for example water-soluble basic salts of the alkali metals and likewise alkaline earth metals of inorganic or organic acids or compounds which liberate alkali in the heat, and furthermore alkali metal silicates. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, trisodium phosphate or waterglass or mixtures thereof, such as for example mixtures of sodium hydroxide solution and waterglass.

The dye mixtures of the invention are notable for a high yield of fixation, a high color strength and a good color build when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water.

The dyeings and prints obtainable with the dye mixtures of the invention have bright hues; especially the dyeings and prints on cellulose fiber materials have good lightfastness and especially very good wetfastnesses, such as wash, milling, water, seawater, crossdyeing and acidic and also alkaline perspiration fastness properties, also good fastness to pleating, hotpressing and rubbing.

Furthermore, the dye mixtures of the invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colourists 1972, 93–99, and 1975, 33–44) can be dyed with very good fastness properties. The process of dyeing on wool is here carded out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with three times the molar amount of an aminobenzenesulfonic acid and/or of an aminonaphthalenesulfonic acid or on the basis of a reaction product of for example stearylamine with ethylene oxide. For instance, the dye mixture of the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures of the invention is very good, they can also be used with advantage in customary continuous dyeing processes. The color strength of the dye mixtures of the invention is very high.

The dye mixtures of the invention dye the materials mentioned, preferably fiber materials, in yellow shades having good fastness properties and low photochromism.

The Examples hereinbelow serve to illustrate the invention. Parts and percentages are by weight, unless otherwise stated. Parts by weight relate to parts by volume as the kilogram relates to the liter. The compounds described in the Examples in terms of a formula are in general prepared and isolated in the form of their salts, preferably sodium or potassium salts, and used for dyeing in the form of their salts. The starting compounds mentioned in the following Examples, especially Table Examples, can similarly be used in the synthesis in the form of the free acid or in the form of their salts, preferably alkali metal salts, such as sodium or potassium salts.

EXAMPLE 1

1000 parts of an aqueous solution containing 150 parts of the hereinbelow indicated dye of the formula (A-1), such as a synthesis solution of this dye, and 500 parts of an aqueous solution containing 80 parts of the hereinbelow indicated dye of the formula (B-1), such as a synthesis solution of this dye

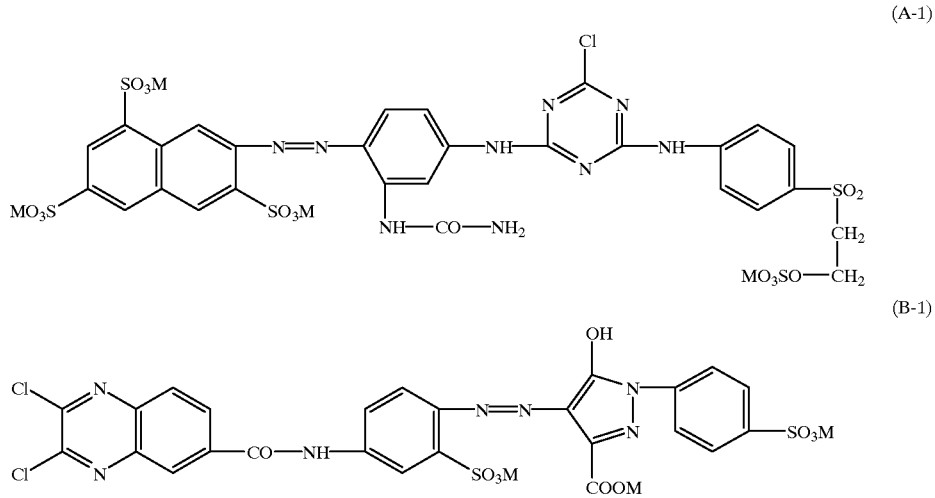

(A-1)

(B-1)

(where M is as defined above, preferably sodium) are mixed with each other. The dye mixture of the invention is isolated from the combined solution in a molar mixing ratio of dye (A-1) to dye (B-1) of 58:42 in a conventional manner, for example by spray drying the dye solution. The resultant dye mixture of the invention which contains electrolyte salts from the synthesis, such as sodium chloride and sodium sulfate, has very good dyeing properties and provides for example on cellulosic fiber materials, such as cotton, or regenerated cellulose fibers, strong and level yellow dyeings when applied by an exhaust dyeing process customary for fiber-reactive dyes.

EXAMPLE 2

1000 parts of an aqueous synthesis solution containing 150 parts of the dye of the formula (A-2) are mixed with 500 parts of an aqueous synthesis solution containing 80 parts of the dye of the formula (B-2)

(where M is as defined above, preferably sodium) and the dye mixture of the invention is isolated, after the two solutions have been combined, in a conventional manner for example by spray drying the dye solution. The resultant dye mixture of the invention, which contains electrolyte salts from the synthesis, such as sodium chloride and sodium sulfate, and has a molar ratio of dye (A-2) to dye (B-2) of 65:35 has very good dyeing properties and provides for example on cellulosic fiber materials, such as cotton, or regenerated cellulose fibers, strong and level yellow dyeings when applied by a cold pad-batch process customary for fiber-reactive dyes.

EXAMPLES 3 TO 24

The Table Examples hereinbelow describe further inventive dye mixtures comprising dyes whose formulae (where M is as defined above) are indicated following the Table.

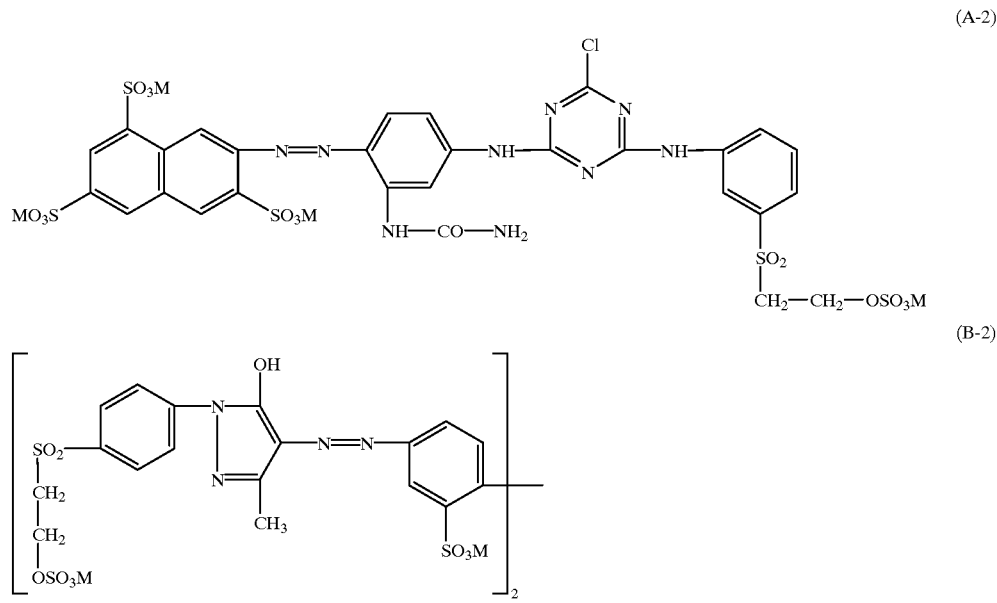

(A-2)

(B-2)

The mixtures possess very good application properties and provide on the materials mentioned in the description part, especially cellulose fiber materials, when applied by the dyeing and printing application methods customary in the art, preferably by the application and fixing methods customary in the art for fiber-reactive dyes, strong yellow dyeings and prints having good fastness properties and a good color build-up. The numerical ratios reported in the MR column specify the molar mixing ratio of the two dyes to each other in mol %.

| Ex. | Dye (1) | Dye (2) | MR of (1):(2) |
| --- | --- | --- | --- |
| 3 | formula (A-2) | formula (B-3) | 55:45 |
| 4 | formula (A-4) | formula (B-3) | 61:39 |
| 5 | formula (A-5) | formula (B-1) | 55:45 |
| 6 | formula (A-6) | formula (B-4) | 56:44 |
| 7 | formula (A-7) | formula (B-5) | 40:60 |
| 8 | formula (A-8) | formula (B-6) | 50:50 |
| 9 | formula (A-9) | formula (B-7) | 42:58 |
| 10 | formula (A-9) | formula (B-8) | 43:57 |

-continued

| Ex. | Dye (1) | Dye (2) | MR of (1):(2) |
| --- | --- | --- | --- |
| 11 | formula (A-3) | formula (B-1) | 52:48 |
| 12 | formula (A-10) | formula (B-2) | 52:48 |
| 13 | 66.5% of formula (A-1) 33.5% of formula (A-2) | formula (B-2) | 50:50 |
| 14 | formula (A-11) | formula (B-2) | 42:58 |
| 15 | formula (A-12) | formula (B-9) | 47:53 |
| 16 | formula (A-13) | formula (B-2) | 53:47 |
| 17 | 50% of formula (A3) 50% of formula (A-13) | formula (B-2) | 50:50 |
| 18 | formula (A-14) | formula (B-2) | 50:50 |
| 19 | formula (A-15) | formula (B-10) | 52:48 |
| 20 | formula (A-16) | formula (B-10) | 60:40 |
| 21 | formula (A-17) | formula (B-10) | 50:50 |
| 22 | formula (A-18) | formula (B-2) | 41:59 |
| 23 | formula (A-19) | formula (B-2) | 50:50 |
| 24 | formula (A-20) | formula (B-2) | 52:48 |

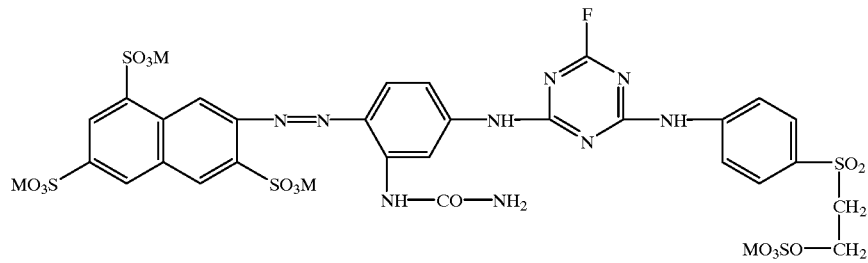

(A-3)

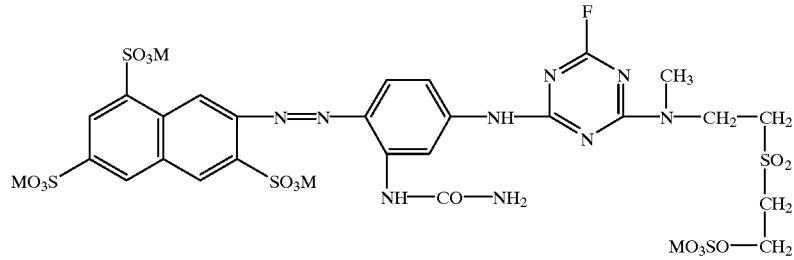

(A-4)

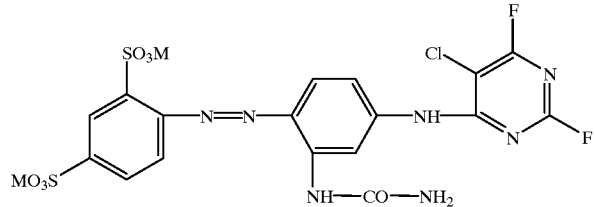

(A-5)

-continued
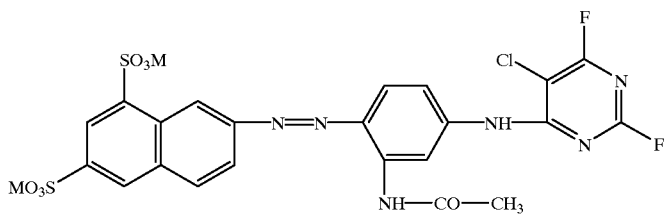
(A-6)
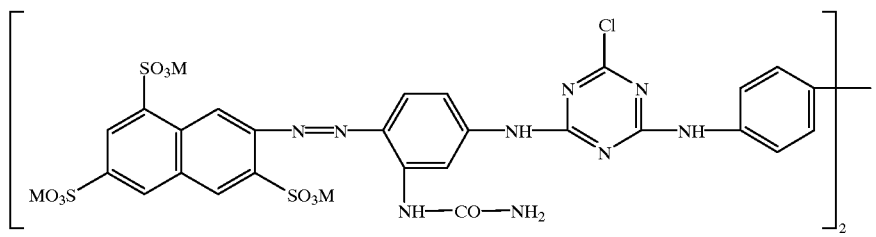
(A-7)
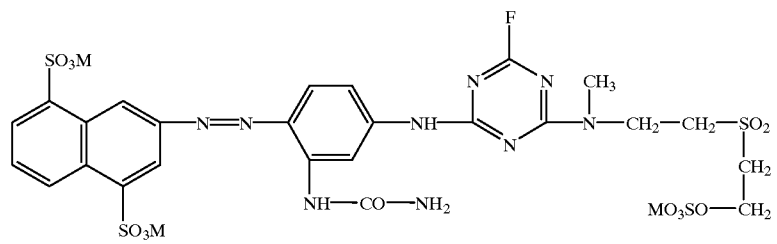
(A-8)
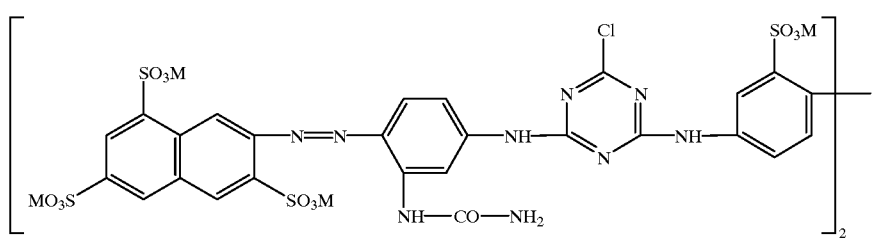
(A-9)
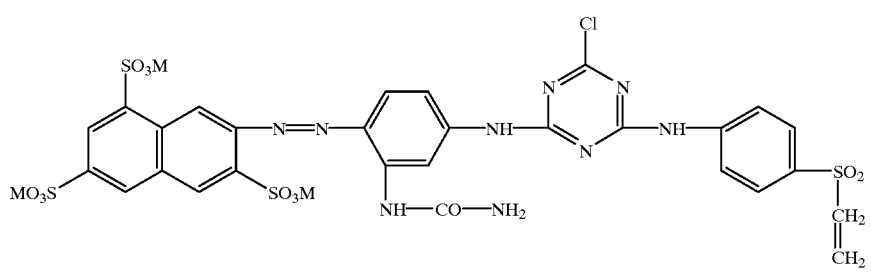
(A-10)
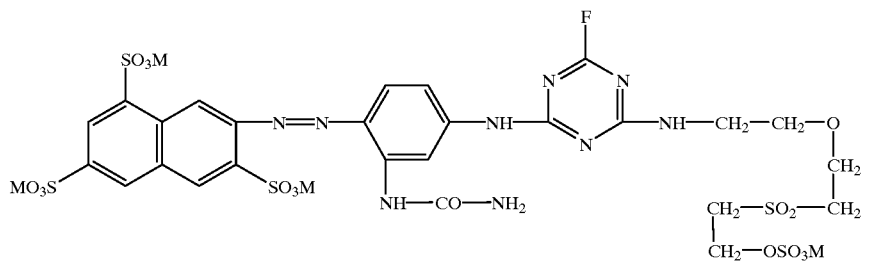
(A-11)

(A-12)
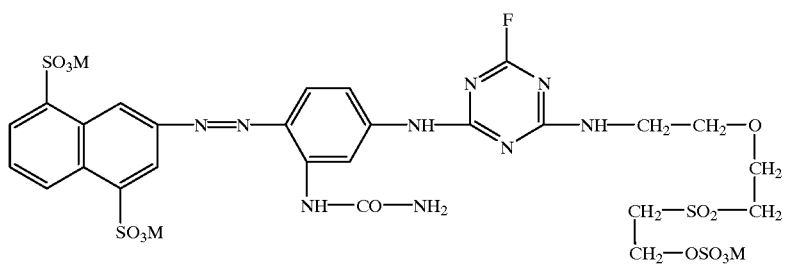
(A-13)
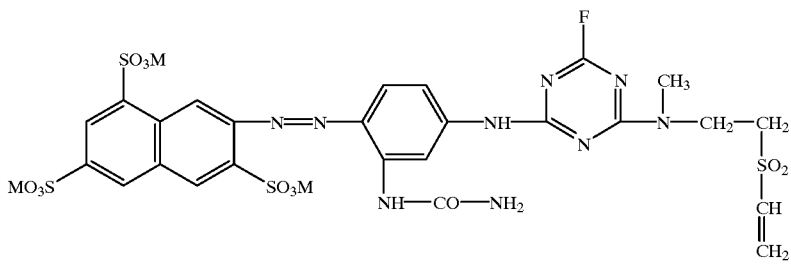
(A-14)
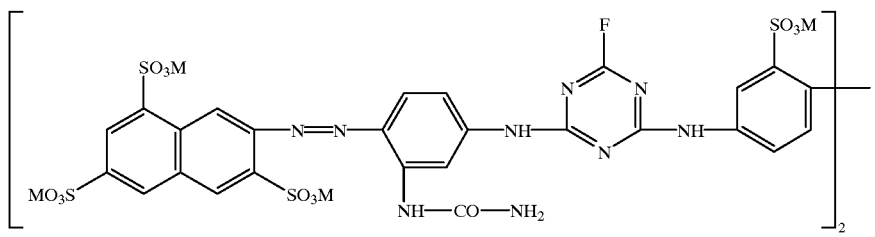
(A-15)
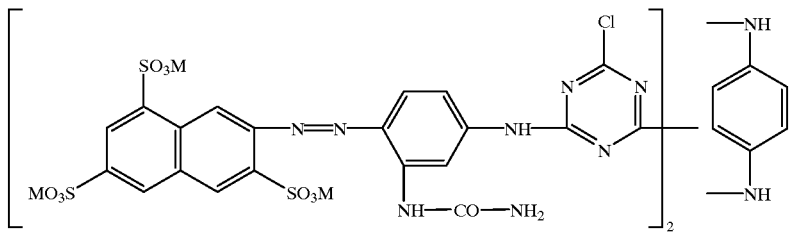
(A-16)
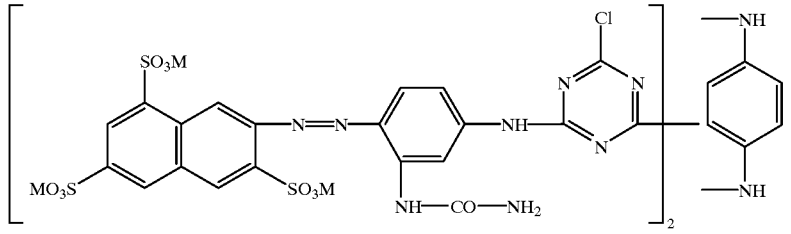
(A-17)
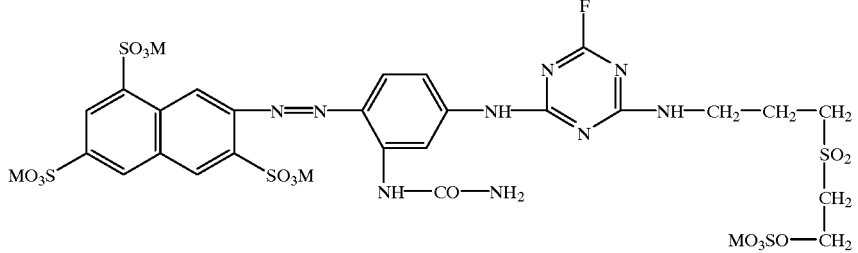

-continued
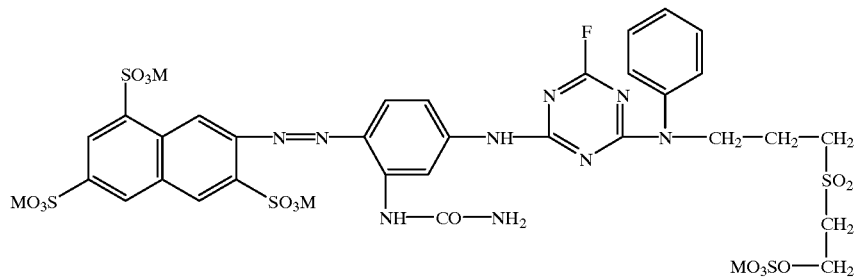
(A-18)
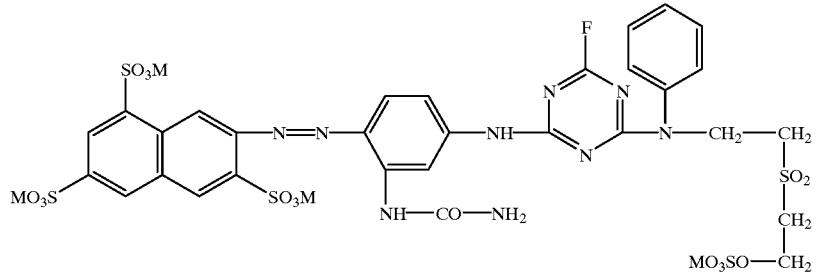
(A-19)
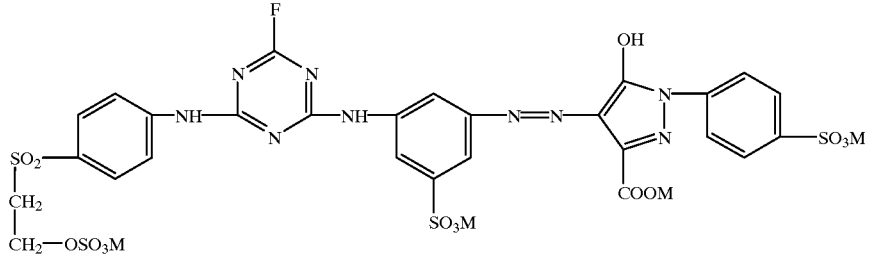
(B-3)
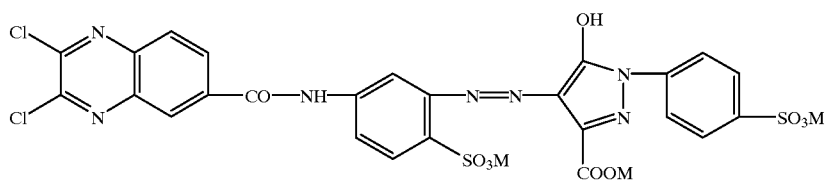
(B-4)
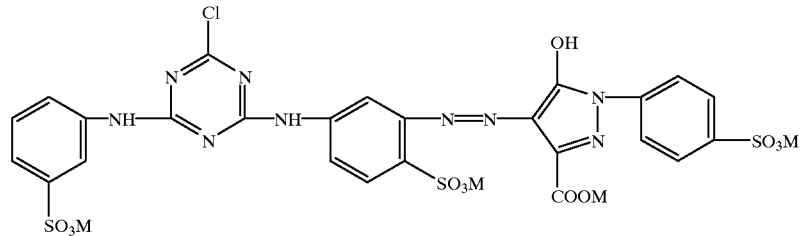
(B-5)
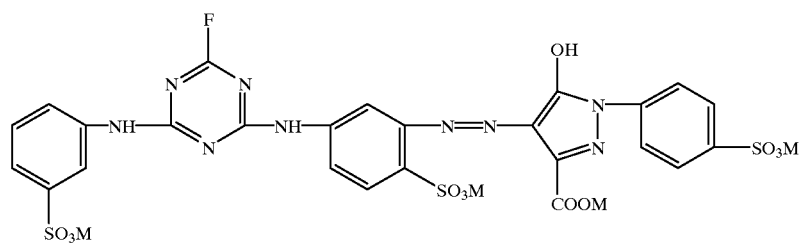
(B-6)

-continued
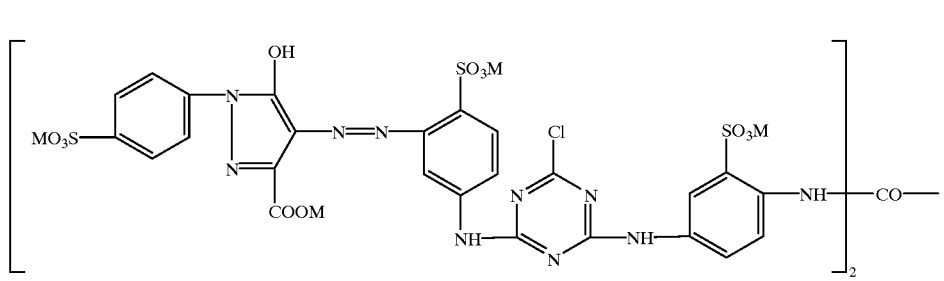
(B-7)
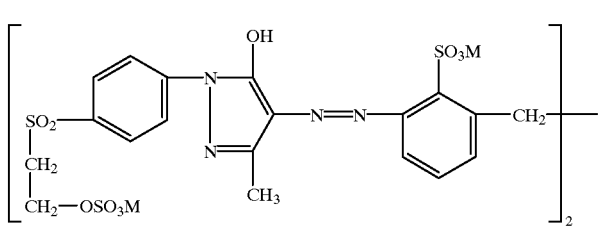
(B-8)
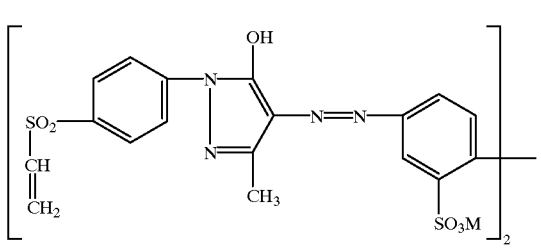
(B-9)
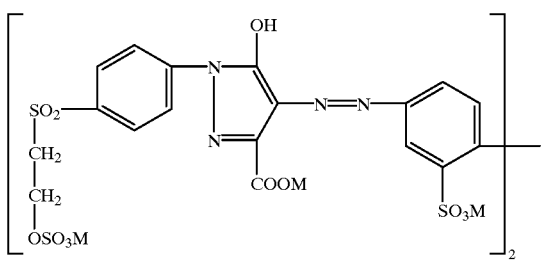
(B-10)
What is claimed is:
1. A dye mixture comprising
i.) one or more dyes of the general formula (1a) or (1b) or of a combination of the dyes of the formulae (1a) and (1b) and
ii.) one or more dyes of the general formula (2a) or (2b) or (2c) or of a combination of the dyes of the formulae (2a) to (2c) in a molar ratio of the dyes i) to ii) of 70:30 to 30:70.

(1a)

$$(MO_3S)_m\text{—}D\text{—}N\text{=}N\text{—}\underset{\underset{NH\text{—}CO\text{—}R}{|}}{\overset{\overset{R^1}{|}}{\bigcirc}}\text{—}NH\text{—}Z$$

(1b)

$$\left((MO_3S)_m\text{—}D\text{—}N\text{=}N\text{—}\underset{\underset{NH\text{—}CO\text{—}R}{|}}{\overset{\overset{R^1}{|}}{\bigcirc}}\text{—}NH\right)_2\text{—}Z^0$$

(2a)

$$\left(\underset{(SO_3M)_p}{\bigcirc_A}\text{—}N\text{=}N\text{—}\underset{R^2}{\overset{OH}{\underset{N}{\bigcirc}}}\text{—}\underset{(SO_3M)_q}{\overset{R^3}{\underset{B}{\bigcirc}}}\right)\text{—}NH\text{—}Z$$

(2b)

$$\left(\underset{(SO_3M)_p}{\bigcirc_A}\text{—}N\text{=}N\text{—}\underset{R^2}{\overset{OH}{\underset{N}{\bigcirc}}}\text{—}\underset{(SO_3M)_q}{\overset{R^3}{\underset{B}{\bigcirc}}}\text{—}\overset{NH}{\underset{NH}{|}}\right)_2 Z^0$$

(2c)

$$\left(\underset{SO_2\text{—}Y^1}{\overset{R^4}{\bigcirc}}\text{—}\underset{R^5}{\overset{OH}{\underset{N}{\bigcirc}}}\text{—}N\text{=}N\text{—}\underset{R^7}{\overset{R^6}{\bigcirc}}\right)_n\text{—}B^0$$

wherein:

M is hydrogen or an alkali metal;

D is the radical of benzene or of naphthalene;

$Y^1$ is vinyl or is ethyl which is substituted in the β-position by an alkali-eliminable substituent;

R is amino or alkyl of 1 to 4 carbon atoms or is alkyl of 1 to 4 carbon atoms which is substituted by carboxyl, sulfo, phosphato hydroxyl or a —SO—$Y^2$ group where $Y^2$ has one of the meanings of $Y^1$;

$R^1$ is hydrogen, alkyl of 1 to 4 carbon atoms, alkoxy of 1 to 4 carbon atoms or sulfo;

m is 1, 2 or 3;

Z is a fiber-reactive radical selected from the group of the halopyrimidines, of the dichloroquinoxalines or of the halotriazines which are optionally substituted by an ether or amino grouping, where the radical of the halotriazine can also be bonded to a group of the general formula —$SO_2$—$Y^3$, where $Y^3$ has one of the meanings of $Y^1$ and this group is attached via a bridge member to an amino group attached to the triazine radical;

$Z^0$ is a bivalent radical of the general formula (3)

(3)

$$\underset{N}{\overset{Hal}{\underset{\|}{\bigcirc}}}\text{—}NH\text{—}W\text{—}NH\text{—}\underset{N}{\overset{Hal}{\underset{\|}{\bigcirc}}}$$

where

Hal is fluorine, and

W is phenylene, alkylene, phenylene-alkylene-phenylene, phenylene-alkenylene-phenylene or phenylene-phenylene or a radical of the general formula phen-G-phen, where the phenylene radicals may be substituted by 1 or 2 substituents selected from the group consisting of methoxy, ethoxy, methyl, ethyl, sulfo and carboxyl, the alkylene radicals contain 1 to 6 carbon atoms, and may be substituted by sulfo or carboxyl and/or interrupted by 1 or 2 hetero groups, and the alkenylene radicals are those of 2 to 4 carbon atoms, and where phen is equal to phenylene of the above definition and G is —O—, —NH—, —CO— or —NH—CO—NH—;

$R^2$ is methyl or carboxyl;

$R^3$ is hydrogen, halogen, alkyl of 1 to 4 carbon atoms or alkoxy of 1 to 4 carbon atoms;

p is zero, 1 or 2 and q is zero, 1 or 2, where the sum of (p+q) is 1, 2 or 3 and the —$SO_3M$ group is hydrogen when p is zero or q is zero;

in the formula (2a) the —NH—Z group is attached to the benzene nucleus A or to the benzene nucleus B;

in the formula (2b) one amino group of the bridge member —NH—$Z^0$—NH— is attached to the benzene nucleus A of one monoazo radical and the other amino group is attached to the benzene nucleus B of the other monoazo radical or both the NH groups are attached to both As or to both Bs;

$R^4$ is hydrogen, sulfo, alkyl of 1 to 4 carbon atoms or alkoxy of 1 to 4 carbon atoms;

$R^5$ is methyl or carboxyl;

$R^6$ is hydrogen, sulfo, carboxyl, alkyl of 1 to 4 carbon atoms or alkoxy of 1 to 4 carbon atoms;

$R^7$ is hydrogen, sulfo, alkyl of 1 to 4 carbon atoms or alkoxy of 1 to 4 carbon atoms;

n is 1 or 2;

$B^0$ is hydrogen when n is 1, or is a direct covalent bond, alkylene, alkenylene or alkylene-phenylene-alkylene when n is 2, in which the phenylene radicals may be substituted by 1 or 2 substituents selected from the group consisting of methoxy, ethoxy, methyl, ethyl, sulfo and carboxyl, the alkylene radicals contain 1 to 6 carbon atoms and may be substituted by sulfo or carboxyl and/or interrupted by 1 or 2 hetero groups and the alkenylene radicals are those of 2 to 4 carbon atoms, or is a group of the hereinabove defined formula element $Z^0$.

2. A dye mixture as claimed in claim 1, wherein Z is a radical of the general formula (4b)

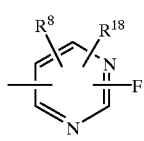
(4b)

where $R^8$ is hydrogen, chlorine or fluorine and $R^{18}$ is hydrogen or fluorine.

3. A dye mixture as claimed in claim 1, wherein Z is a radical of the general formula (4c) or (4d)

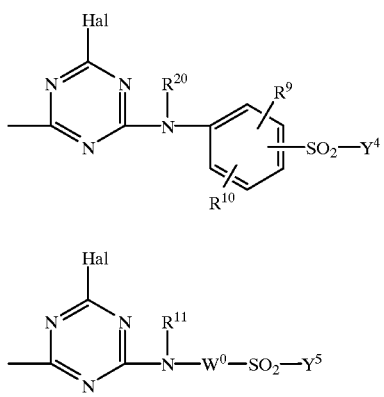

(4c)

(4d)

where Hal is chlorine or fluorine, $R^9$ is hydrogen, alkyl of 1 to 4 carbon atoms or alkoxy of to 4 carbon atoms, $R^{10}$ is hydrogen, alkyl of 1 to 4 carbon atoms or alkoxy of 1 to 4 carbon atoms, $R^{10}$ is hydrogen or alkyl of 1 to 4 carbon atoms, $R^{11}$ is hydrogen, alkyl of 1 to 4 carbon atoms, phenyl or chlorine-, sulfo-, methyl- or carboxyl-substituted phenyl, $Y^4$ is vinyl or is ethyl which is substituted in the β-position by an alkali-eliminable substituent, $Y^5$ has one of the meanings given for $Y^4$ and $W^0$ is alkylene of 1 to 4 carbon atoms or alkylene of 3 to 6 carbon atoms which is interrupted by 1 or 2 hetero groups selected from the group consisting of —O— and —NH— or is a radical of the formula alk-phen or phen-alk or phen where alk is methylene, n-ethylene or n-propylene and phen is phenylene which may be substituted by 1 or 2 substituents selected from the group consisting of sulfo, alkyl of 1 to 4 carbon atoms and alkoxy of 1 to 4 carbon atoms.

4. A dye mixture as claimed in claim 1, wherein $R^1$ is disposed para to the —NH—CO—R group.

5. A dye mixture as claimed in claim 3, wherein $R^9$ and $R^{10}$ are both hydrogen.

6. A dye mixture as claimed in claim 3, wherein $R^{11}$ is hydrogen, methyl, ethyl or phenyl and $W^0$ is n-ethylene, n-propylene or alkylene of 3 to 6 carbon atoms which is interrupted by 1 or 2 hetero groups selected from the group consisting of —O— and —NH—.

7. A dye mixture as claimed in claim 1, wherein $Z^0$ is a radical of the general formula (3)

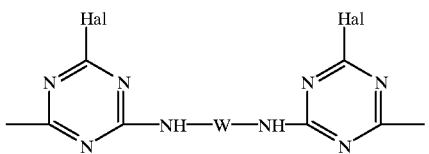

(3)

where Hal is fluorine, W is phenylene, alkylene, phenylene-alkylene-phenylene, phenylene-alkenylene-phenylene or phenylene-phenylene or a radical of the general formula phen-G-phen, where the phenylene radicals may be substituted by 1 or 2 substituents selected from the group consisting of methoxy, ethyoxy, methyl, ethyl, sulfo and carboxyl, the alkylene radicals contain 1 to 6 carbon atoms and may be substituted by sulfo or carboxyl and/or interrupted by 1 or 2 hetero groups and the alkenylene radicals are those of 2 to 4 carbon atoms and where phen is equal to phenylene of the above definition and G is an —O—, —NH—, —CO— or —NH—CO—NH— group.

8. A dye mixture as claimed in claim 1, wherein n is 1 and $B^0$ is hydrogen.

9. A dye mixture as claimed in claim 1, wherein n is 2 and $B^0$ is a direct bond, alkylene, alkenylene or alkylene-phenylene-alkylene, where the phenylene radicals may be substituted by 1 or 2 substituents selected from the group consisting of methoxy, ethoxy, methyl, ethyl, sulfo and carboxyl, the alkylene radicals contain 1 to 6 carbon atoms and may be substituted by sulfo or carboxyl and/or interrupted by 1 or 2 hetero groups and the alkenylene radicals are those of 2 to 4 carbon atoms.

10. A dye mixture as claimed in claim 1, wherein n is 2 and $B^0$ is a group of the general formula (3)

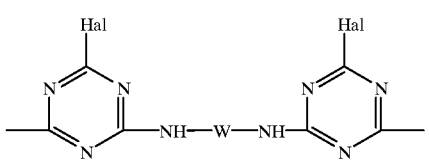

(3)

where Hal is fluorine, W is phenylene, alkylene, phenylene-alkylene-phenylene, phenylene-alkenylene-phenylene or phenylene-phenylene or a radical of the general formula phen-G-phen, where the phenylene radicals may be substituted by 1 or 2 substituents selected from the group consisting of methoxy, ethoxy, methyl, ethyl, sulfo and carboxyl, the alkylene radicals contain 1 to 6 carbon atoms and may be substituted by sulfo or carboxy and/or interrupted by 1 or 2 hetero groups and the alkenylene radicals are those of 2 to 4 carbon atoms and where phen is equal to phenylene of the above definition and G is an —O—, —NH—, —CO— or —NH—CO—NH— group.

11. A dye mixture as claimed in claim 1, including a dye of the general formula (1a)

(1a)

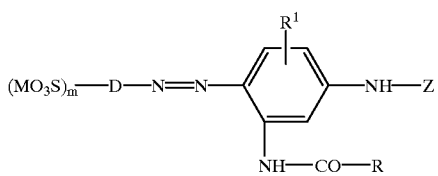

where D, M, m, R, R$^1$ and Z are each as defined in claim 1.

12. A dye mixture as claimed in claim 1, wherein the dye of the general formula (2a) is a dye of the general formula (5a)

(5a)

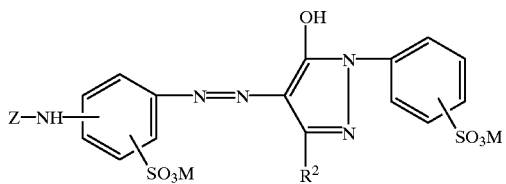

where M, R$^2$ and Z are each as defined in claim 1.

13. A dye mixture as claimed in claim 1, wherein the dye of the general formula (2c) is a dye of the general formula (5c)

(5c)

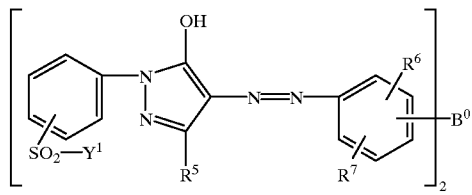

where Y$^1$ and R$^5$ are each as defined in claim 1, R$^6$ is hydrogen, methyl or sulfo, R$^7$ is hydrogen or sulfo and B$^0$ is a direct bond or methylene, n-ethylene or vinylidene.

14. A dye mixture as claimed in claim 1, wherein the dye of the general formula (2c) is a dye of the general formula (5b)

(5b)

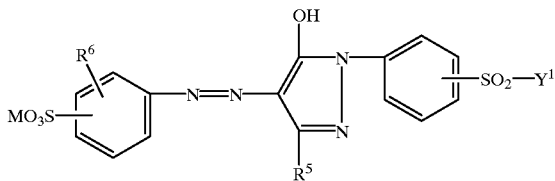

where M, R$^5$, R$^6$ and Y$^1$ are each as defined in claim 1.

15. A dye mixture as claimed in claim 1, wherein Y$^1$ is vinyl, β-chloroethyl or β-sulfatoethyl.

16. A dye mixture as claimed in claim 1, wherein Y$^2$ is vinyl, β-chloroethyl or β-sulfatoethyl.

17. A dye mixture as claimed in claim 1, wherein Y$^3$ is vinyl, β-chloroethyl or β-sulfatoethyl.

18. A dye mixture as claimed in claim 1, wherein the dye or dyes (1) and the dye or dyes (2) are present in a molar mixing ratio of 60:40 to 40:60.

19. A process for dyeing a hydroxyl- and/or carboxamido-containing material which comprises applying the dye mixture as claimed in claim 1 to the material and fixing them on the material by (a) means of heat (b) with the aid of an alkaline agent or (c) by means of heat and with the aid of an alkaline agent.

20. A process according to claim 19, wherein the material to be dyed is a fiber material.

\* \* \* \* \*

UNITED STATES PATENT AND TRADEMARK OFFICE
CERTIFICATE OF CORRECTION

PATENT NO. : 6,238,442 B1
DATED : May 29, 2001
INVENTOR(S) : Christian Schumacher et al.

Page 1 of 1

It is certified that error appears in the above-identified patent and that said Letters Patent is hereby corrected as shown below:

<u>Column 25, claim 3,</u>
Line 38, "$R^{10}$" should read -- $R^{20}$ --.

Signed and Sealed this

Twelfth Day of February, 2002

Attest:

JAMES E. ROGAN
*Attesting Officer*   *Director of the United States Patent and Trademark Office*